Nov. 3, 1964  J. D. EKSTRAND  3,154,878
DEEP WATER FISHING BOBBER
Filed Oct. 29, 1962
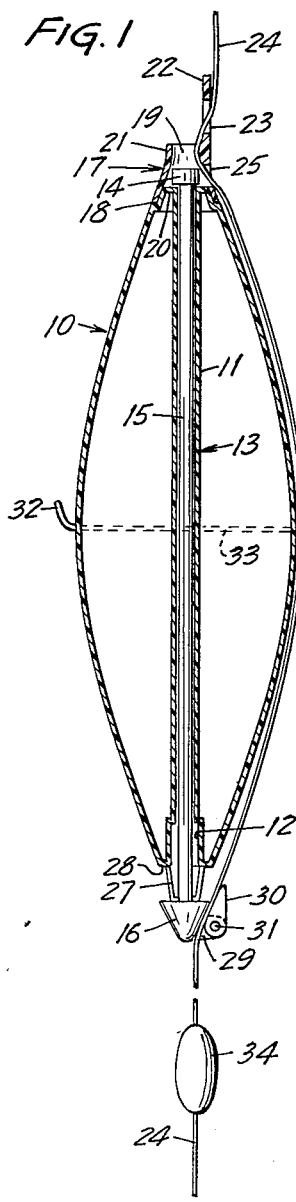
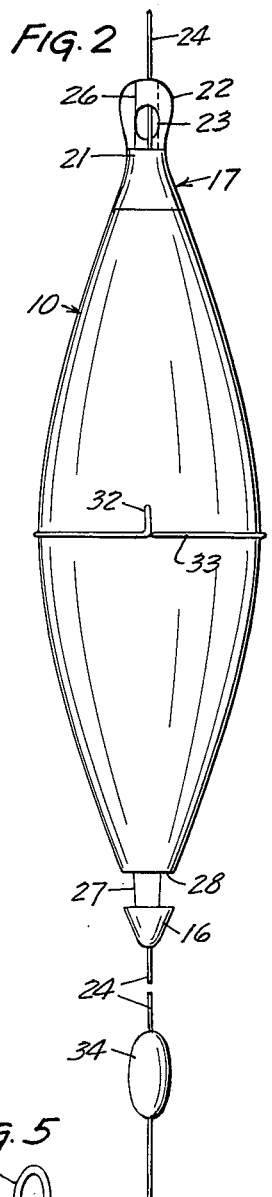
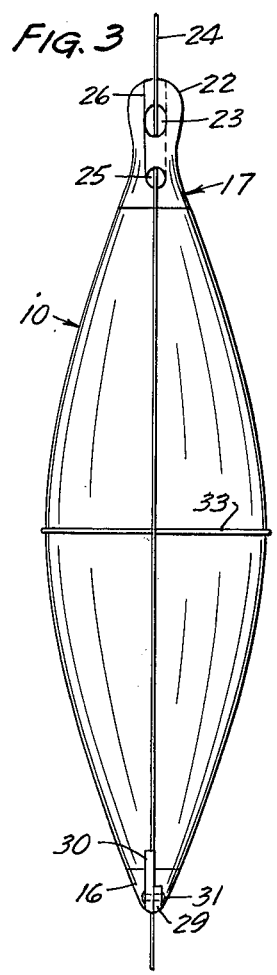
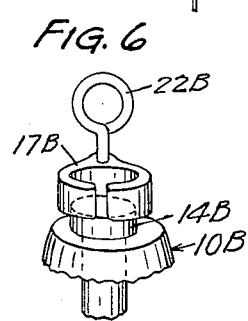
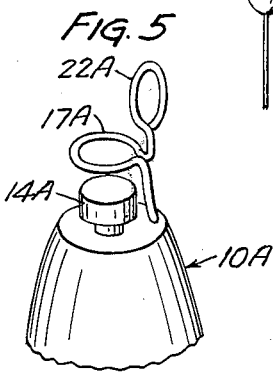
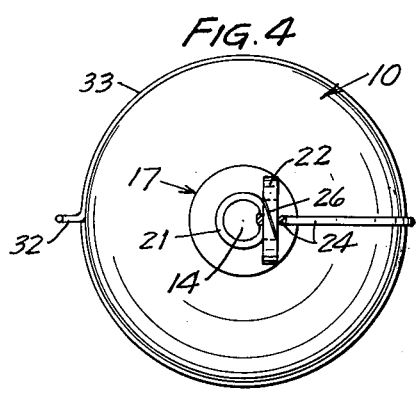
INVENTOR
JEROME D. EKSTRAND
BY Moore, White & Burd
ATTORNEYS United States Patent Office 3,154,878
Patented Nov. 3, 1964

3,154,878
DEEP WATER FISHING BOBBER
Jerome D. Ekstrand, 3669 S. 4400 West,
Salt Lake City, Utah
Filed Oct. 29, 1962, Ser. No. 233,532
10 Claims. (Cl. 43—44.88)

This invention relates generally to fishing bobbers and particularly to bobbers used for casting in deep water.

Fishing by casting in deep water presents problems both in casting and in reeling-in. This is due primarily to the length of the line between the bobber and the hook necessary to suspend the hook at the desired depth. When casting, the hook and line are difficult to control because of the length of the line. When reeling-in, the bobber normally forms an obstacle which prevents reeling the line in beyond the point at which the bobber is attached to the line. The present invention is designed to alleviate these difficulties.

The invention is illustrated in the accompanying drawings in which the same numerals designate corresponding parts and in which:

FIGURE 1 is a side elevation, in section, of the bobber according to the present invention, shown in reeling-in position;

FIGURE 2 is a front elevation of the bobber as shown in FIGURE 1;

FIGURE 3 is a rear elevation of the bobber according to the present invention, shown in casting position;

FIGURE 4 is a somewhat enlarged top plan view showing the location of slot means for threading the fishing line through the top of the bobber;

FIGURE 5 is a fragmentary perspective view showing a modified form of bobber top; and FIGURE 6 is a fragmentary perspective view of another form of bobber top construction.

Referring now to the drawings and particularly to FIGURES 1 through 4, the bobber according to the present invention comprises a buoyant ovoid body indicated generally at 10. The body 10 may be a sealed hollow shell filled with air or other gas, as illustrated, or it may be composed of a solid light weight buoyant material. The body is provided with a central longitudinal tubular channel 11 extending through the entire length of the body. The bottommost end of channel 11 is enlarged slightly at 12 to provide a spring receiving recess, as described in greater detail hereinafter.

A longitudinal plug indicated generally at 13, extends through the entire length of the body for limited longitudinal movement in channel 11. The plug 13 includes a cylindrical head 14 of diameter larger than the diameter of channel 11, a shaft 15 of diameter to fit with a loose slide fit in channel 11 and a tapered tip 16 whose base is larger in diameter than the diameter of recess 12. Movement of the plug is limited in both directions by the enlarged head and enlarged tip.

A tapered circular collar member 17 is secured to the top end of body 10 supported on a recessed shoulder 18 at the top end of the body. Collar 17 defines a generally open ended frusto-conical chamber 19 with the top wall 20 of the bobber body. The upper lip 21 of collar 17 defines a restricted opening to chamber 19. This opening is of slightly larger diameter than plug head 14 so that the plug head fits with a loose sliding fit therein when no line extends through the collar and when the plug is in its uppermost position.

One side of collar 17 is provided with an upstanding eye member 22 extending beyond the upper lip 21 of the collar. A hole 23 is provided in the eye member 22 to receive a fish line 24 for attachment of the bobber, as hereinafter explained. A further hole 25 is provided in the wall of collar 17 in longitudinal alignment with hole 23 in the eye member and in communication with the chamber 19 enclosed by the collar. In normal use of the bobber, a fish line 24 extends around the back surface of eye member 22, through hole 23 and into the chamber 19, and thence out from chamber 19 through hole 25.

In order to facilitate threading of the fishing line through the holes in this manner, a diagonal longitudinal slot 26 is provided in collar 17 and eye member 22 extending from the top of the eye member through hole 23 to hole 25. The collar and eye member are preferably formed from some material, such as a synthetic resinous plastic substance, having slight resilience in which event the slot 26 may be slightly narrower than the fish line and may be forced apart with a thumb nail or the like to facilitate entry and passage of the fish line.

A U-shaped spring 27 is disposed about the bottom end of the plug shaft 15 adjacent the broad base of plug tip 16. The side arms of spring 27 are about equal in length to the limited distance by which plug 13 is movable through the longitudinal channel 11 in the bobber body 10. The side arms of the spring 27 normally urge outwardly away from one another. When these side arms are compressed and force is at the same time applied against the tip 16, the spring is received in the channel recess 12, and the plug may be moved upwardly until the base of the tip 16 abuts the bottom wall 28 of the body 10 as shown in FIGURE 3. When the shaft is moved upwardly, the plug head 14 is pushed into the opening defined by the collar lip 21 and wedges the fish line 24 between the plug head and collar lip to hold the bobber securely in place on the line. When the tip 16 is in its extended position the line 24 is free to move through the collar. The tip is maintained in extended position by the ends of spring 27 bearing against the outside of bobber bottom wall 28.

One side of plug tip 16 is provided with a projecting lug 29 to which an eccentric cam 30 is secured for pivotal movement by a pin 31 or the like. The fish line 24 is passed between the cam 30 and surface of tip 16. When the cam is in its upward position, as shown in FIGURES 1 and 3, it engages the line to clamp it securely in place against the side of the plug tip. Any downward force applied against the fish line serves to tighten the clamping action of the cam. An upward force releases the cam line lock. A hook member 32 is provided on the side of the bobber body, as for example by extending a wire 33 around the waist of the bobber body. This is for the purpose of engaging a fish hook during casting for easy release upon hitting the water.

When the bobber according to the present invention is in use, enough of fish line 24 is extended below the plug tip 16 for the proper depth of the area being fished. Cam 30 is locked on the line to maintain this desired length of line. The side arms of U shaped spring 27 are then compressed and pressure is exerted against the plug tip to slide the spring into the channel recess 12. As this is done, plug 13 is moved upwardly through the channel 11 and plug head 14 is forced into the narrow opening of the collar 17. This clamps that portion of fish line 24 which extends through eye opening 23 and out opening 25 tightly in place between the plug head and the inside of the collar. The fish hook is looped over hook 32 and the cast is then made.

When the bobber lands on the water, the sinker 34 causes the fish hook to slide off hook 32 and to sink to the proper depth in the water. When a fish bites on the fish hook, the force exerted by the fish pulls downwardly on the line and this force is transmitted by the line to the plug tip 16 where the line is clamped in place by the cam 30. Because the plug tip is clamped to the line, this downward force upon the bobber plug tip pulls the plug downwardly to disengage the spring 27 from the recess 12. The spring 27 expands to lock the plug in its downward extended position. As the plug moves downwardly, the plug head 14 is disengaged from the collar 17 to unclamp the fish line 24.

The fisherman then reels in the line. As the line is reeled in, the end of the fishing rod first comes in contact with the eye member 22 at the top of the bobber. Then, as the fisherman continues to reel in his line, the upward pull of the line causes cam 30 to become unlocked and, because the line has already been freed at the collar, the bobber slides freely on the line allowing the length of line extended below the plug tip 16 to be reeled in to permit recovery of the fish on the hook at the end of the line. The bobber is reset by again extending the line to the desired depth and again clamping it to the line by means of cam 30 and collar 17 engaged by plug head 14.

In FIGURE 5, there is shown a modified form of bobber in which both eye member 22A and collar member 17A are formed from a single piece of wire bent to the proper shape and inserted in the top end of body 10A. Upon upward movement of the plug head 14A, the collar 17A is engaged to clamp the fishing line in place. In this form of construction, the line is threaded through the eye member and collar by forcing the line between the adjacent separate portions of the wire defining the eyelet and collar.

In FIGURE 6, there is shown a further modified form of bobber construction. According to this structure, eyelet member 22B is formed of wire, the end of which is inserted in body 10B. A collar 17B, formed of synthetic resinous plastic material or the like, is secured to the shank of the eyelet member spaced from the top of the body 10B. As the plug head 14B is moved upwardly, it engages and clamps the fishing line within the collar 17B The collar 17B is desirably split as shown, both to afford greater resilience and to facilitate threading of the line. In both modified forms of bobber, the lower tip and cam clamp remain the same as shown in FIGURES 1 and 3.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A deep water fishing bobber comprising a buoyant bobber body, a channel extending through said body, a plug member extending through said channel for limited longitudinal sliding movement therein, an enlarged tip on one end of said plug member external of said body, line locking means on said tip, an enlarged head on the opposite end of said plug member, a collar member at the same end of said body, said head being adapted to engage said collar member upon sliding movement in the direction of said collar, an eye member at the same end of said body to guide fish line through said collar between said collar wall and plug head and means at the tip end of said plug member to control the position of said plug head relative to said collar.

2. A deep water bobber according to claim 1 further characterized in that said buoyant bobber body is a sealed hollow ovoid shell and said channel is a tube extending longitudinally through the center of said shell.

3. A deep water bobber according to claim 1 further characterized in that said line locking means on said plug tip comprises a lug extending from said plug tip, an eccentric cam pivotally mounted on said lug for clamping engagement against the plug tip wall.

4. A deep water bobber according to claim 1 further characterized in that said means for controlling the position of the plug head relative to the collar comprises an enlarged recess at the tip end of said channel and a U shaped spring on said plug adjacent said tip, said spring adapted to be received in said recess and press against the walls thereof.

5. A deep water bobber according to claim 1 further characterized by the presence on the bobber body of a fish hook engaging means to temporarily and releasably retain a fish hook during casting of the bobber.

6. A deep water fishing bobber comprising a buoyant bobber body, a hollow tubular channel extending longitudinally through said body, an enlarged recess at one end of said channel, a plug member extending through said channel for limited longitudinal sliding movement therein, an enlarged tip on one end of said plug member adjacent said enlarged channel recess, a U shaped spring on said plug member adjacent said tip the arms of said spring adapted to be received in said channel recess and to press against the walls thereof to hold said plug in one position and to press against the body wall adjacent said recess to hold said plug in its other position, eccentric cam line locking means on said plug tip, an enlarged head on the opposite end of said plug member, a collar member secured to said body at the same end, said plug head being adapted to engage said collar member upon sliding movement in the direction of said collar, an eye member secured to the same end of said body to guide fish line through said collar between said collar wall and plug head, the position of said plug head relative to said collar being controlled by the position of said spring relative to said channel recess at the opposite end of said bobber body.

7. In a deep water fishing bobber including a bobber body and means to releasably secure said bobber body to a fish line, further releasable line locking means comprising a projecting cam supporting surface secured to and extending from said bobber, and an eccentric cam pivotally mounted on said cam supported surface for clamping engagement of line against said bobber, said cam being rotatable toward said bobber body whereby its clamping action is tightened against force exerted on the fish line from the fish hook end and said cam being rotatable away from said bobber body to release said line upon application of force on the fish line from the reel end.

8. Releasable line locking means for a deep water fishing bobber, said locking means comprising a projecting cam supporting surface secured to and extending from said bobber, an eccentric cam pivotally mounted on said cam supporting surface, said cam being rotatable toward said bobber surface to apply clamping pressure on a fish line between the edge of said cam and said bobber surface and said cam being rotatable away from said bobber surface to release said clamping pressure on application of force on the fish line from the reel end of the bobber.

9. A deep water fishing bobber comprising a buoyant bobber body, a channel extending through said body, an elongated member extending through said channel for limited longitudinal sliding movement therein, an enlargement at one end of said elongated member, line locking means on said enlargement including a cam supporting surface and an eccentric cam pivotally mounted on said cam supporting surface for clamping engagement of fish line against the bobber, resilient means on said enlargement for inhibiting sliding movement of said elongated member in one direction, and means at the opposite end of said elongated member for inhibiting sliding movement of said elongated member in the opposite direction.

10. A deep water fishing bobber comprising a buoyant bobber body, an elongated channel extending longitudinally through said body, line locking means associated with the bobber adjacent one end of said channel, said means including an integral projecting cam supporting surface secured to and extending outwardly from the bobber, and an eccentric cam pivotally mounted on said cam supporting surface for clamping engagement of line against said bobber, said cam being rotatable toward said bobber body whereby its clamping action is tightened against force exerted on the fish line from the fish hook and said cam being rotatable away from said bobber body to release said line upon application of force from the reel end.

References Cited in the file of this patent

UNITED STATES PATENTS

| | | |
|---|---|---|
| 2,440,989 | Van Brunt | May 4, 1948 |
| 2,607,154 | Martens | Aug. 19, 1952 |
| 2,694,878 | Martens | Nov. 23, 1954 |